United States Patent [19]

Stark

[11] Patent Number: 5,774,976

[45] Date of Patent: Jul. 7, 1998

[54] APPARATUS FOR MAKING PERMANENT MAGNET ROTOR

[75] Inventor: William H. Stark, Fort Wayne, Ind.

[73] Assignee: General Electric Company, Fort Wayne, Ind.

[21] Appl. No.: 680,188

[22] Filed: Jul. 15, 1996

Related U.S. Application Data

[62] Division of Ser. No. 872,551, Apr. 23, 1992, Pat. No. 5,563,463, which is a division of Ser. No. 721,689, Jun. 26, 1991, Pat. No. 5,144,735, which is a division of Ser. No. 459,633, Jan. 2, 1990, Pat. No. 5,040,286, which is a continuation-in-part of Ser. No. 203,942, Jun. 8, 1988, abandoned.

[51] Int. Cl.[6] ................................................ H02K 15/02
[52] U.S. Cl. ...................................... 29/732; 29/759
[58] Field of Search ................................ 29/732, 596, 759, 29/598; 310/156

[56] References Cited

U.S. PATENT DOCUMENTS

| | | |
|---|---|---|
| 3,531,670 | 9/1970 | Loudon . |
| 4,088,177 | 5/1978 | Armstrong et al. . |
| 4,351,103 | 9/1982 | Rodenbeck ......................... 29/732 X |
| 4,433,261 | 2/1984 | Nashiki et al. . |
| 4,586,244 | 5/1986 | Muller . |
| 4,587,721 | 5/1986 | Muller ............................... 29/732 X |
| 4,674,178 | 6/1987 | Patel . |
| 4,742,259 | 5/1988 | Schaefer et al. . |

Primary Examiner—Carl E. Hall
Attorney, Agent, or Firm—Wayne O. Traynham

[57] ABSTRACT

A permanent magnet rotor for an electronically commutated motor (ECM) has a core, a plurality of magnetizable elements spaced around the core, and a thin-walled retaining shell which has been stretched around the core and magnetizable elements to hold the elements in position. The rotor is made by an inventive method which involves axially aligning the core and surrounding magnetizable elements with the retaining shell, and cold-pressing the retaining shell over the core and elements to sandwich the elements between the shell and core. The core and magnetizable elements serve as a mandrel about which the shell is reformed in a cold working operation. Other aspects of the invention include the fixturing apparatus used to align the core and magnetizable elements with the retaining shell, and apparatus which is used to evenly space the magnetizable elements around the core and hold the elements in position during at least a portion of the cold-pressing operation. Additional features of certain embodiments of the rotor of the present invention include end plates axially disposed adjacent the ends of the rotor core and magnetizable elements, and the use of adhesives between the core and magnetizable elements and/or the ends of the core and magnetizable elements and the end plates.

7 Claims, 9 Drawing Sheets

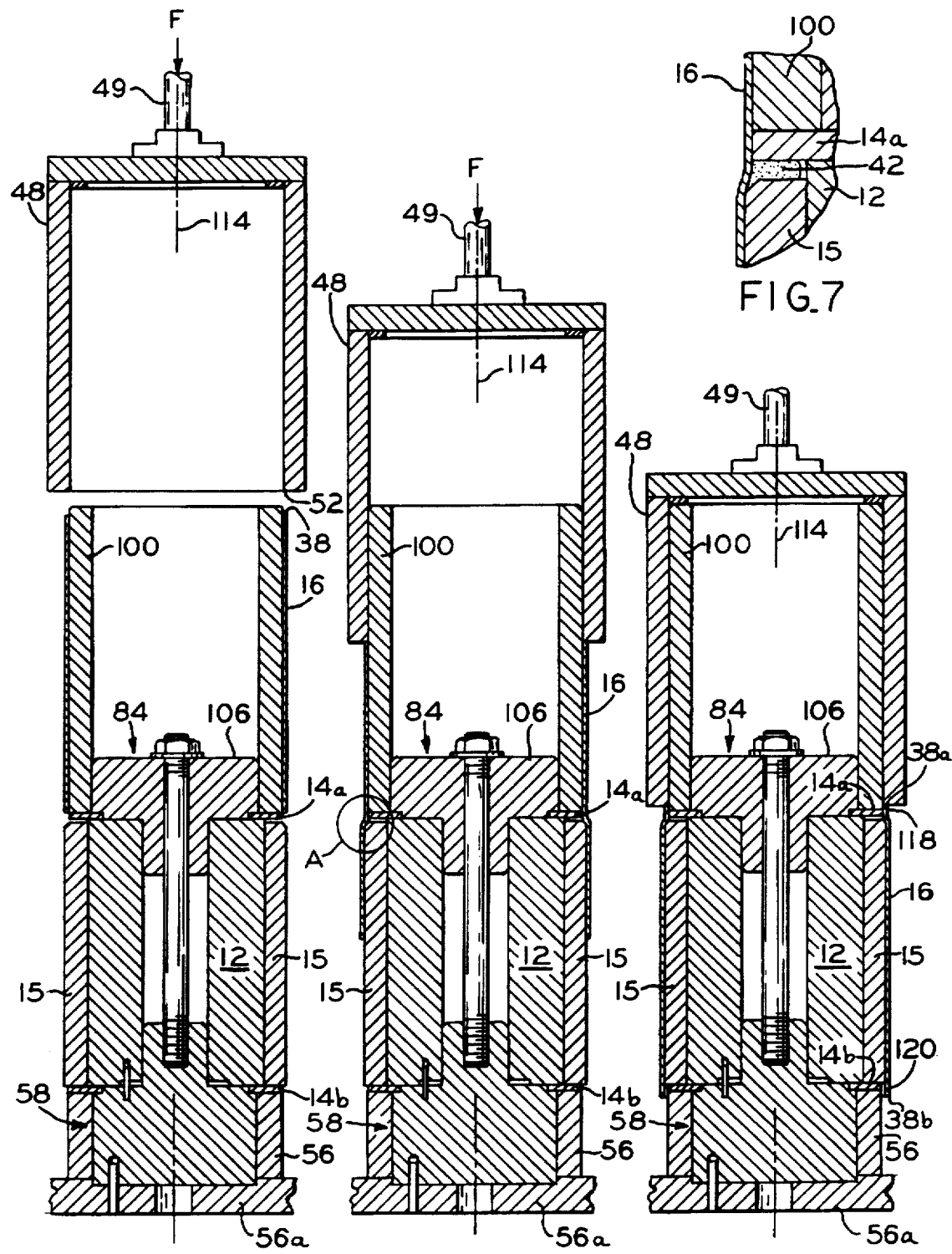

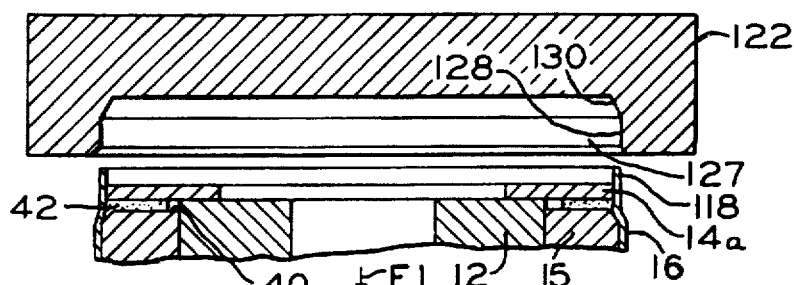
FIG 8(a)
FIG 8(b)
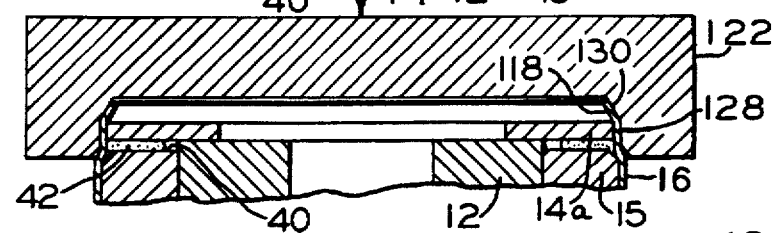
FIG 8(c)
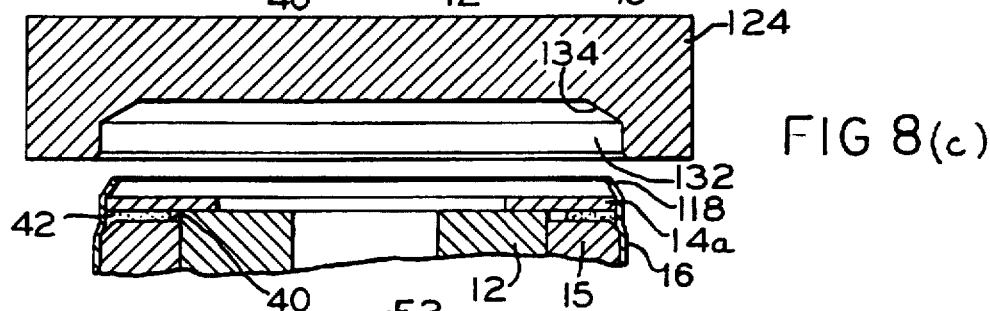
FIG 8(d)
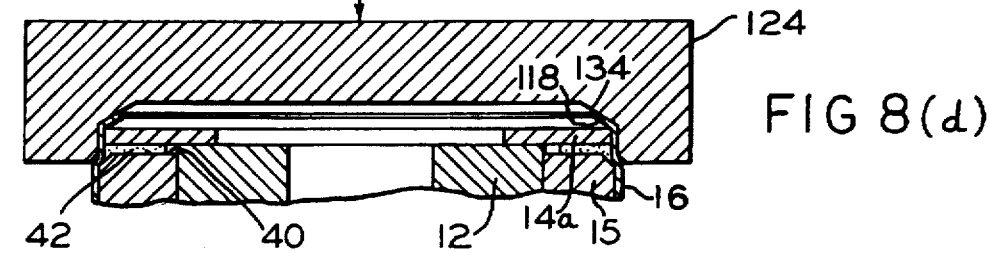
FIG 8(e)
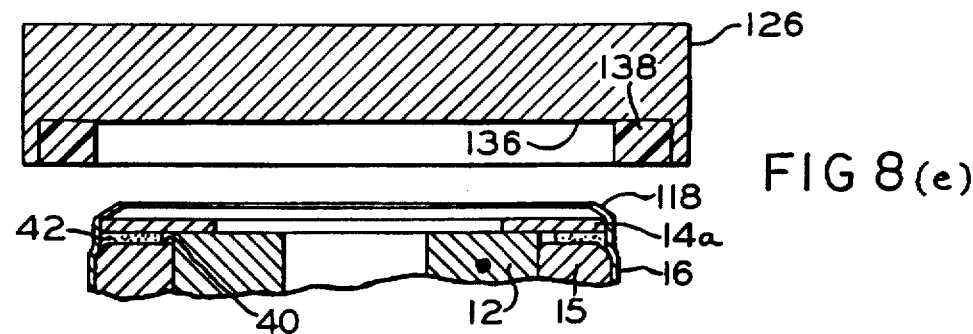
FIG 8(f)
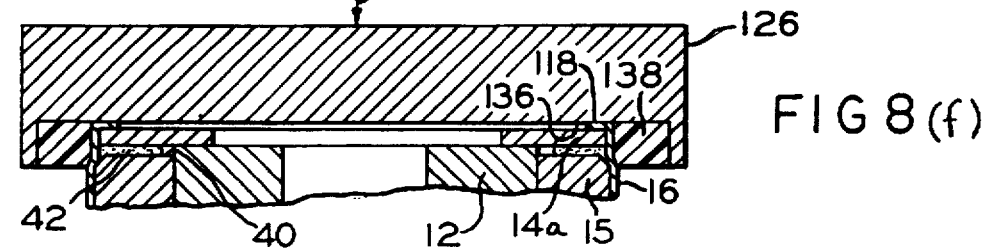

5,774,976

1

APPARATUS FOR MAKING PERMANENT MAGNET ROTOR

FIELD OF INVENTION

This is a divisional application from Ser. No. 07/872,551, filed Apr. 23, 1992, 5,563,463 which is a division from Ser. No. 07/721,689, filed Jun. 26, 1991, now U.S. Pat. No. 5,144,735, which is a division from Ser. No. 07/459,633, filed Jan. 2, 1990, now U.S. Pat. No. 5,040,286, which is a continuation-in-part from application Serial No. 07/203,942, filed Jun. 8, 1988, abandoned. The present invention relates generally to permanent magnet rotors for electric motors, and more specifically to a novel rotor having particular application in electronically commutated motors (ECMS) operable at relatively high rotor speeds, and to a novel method and apparatus for making the rotor.

BACKGROUND OF THE INVENTION

Permanent magnet rotors for ECM motors typically comprise a solid or laminated iron core, surrounded by a plurality of magnetic elements. The materials typically used to form the magnetic elements include barium or strontium ferrite (traditional ferrite magnets) and samarium cobalt (rare-earth magnets). The former are often referred to as ceramic magnets and are generally manufactured by pressing a granular or powdered ferrite material into a mold of desired shape, and "firing" or heating the molded element in a kiln until cured. Permanent magnet rotors of this type are used primarily in electric motors and in conjunction with control circuitry and other associated apparatus of the type as disclosed, for example, in the following United States patents (as well as the assigned to the assignee of the present application and incorporated herein by reference: U.S. Pat. No. 4,456,845 (Cunningham); U.S. Pat. No. 4,466,165 (Otto); U.S. Pat. No. 4,476,736 (Hershberger) and related divisional applications listed therein; U.S. Pat. No. 4,654,566 (Erdman) and related continuation and continuation-in-part applications listed therein; and U.S. Pat. No. 4,686,436 (Archer). Rotors produced in accordance with the present invention can be used to particular advantage in hermetically sealed refrigeration compressor applications where exposure to refrigeration and/or lubricating fluids is likely to occur, and where relatively high efficiency ratings may be required.

Due to the relatively high mass of the materials used to form the permanent magnetic elements disclosed in the aforelisted patents, and the relatively high (1,000–16,000 RPM) rotor speeds developed in the associated motors, retention of the magnetic elements in position adjacent the rotor core is a serious concern. A number of methods and techniques for retaining magnetic elements on the rotor core have previously been used or considered. One such technique involves positioning the magnetic elements around the outer diameter of the core, and applying a wrap of Kevlar or fiberglass to hold the magnets in place. The Kevlar or fiberglass used is typically a fine stranded material which is pulled through epoxy prior to wrapping. An adhesive filler may be applied to the wrapped rotor to fill voids and provide a more rigid construction. A drawback in this technique, however, is that the ends of the stranded material are difficult to attach to the rotor core, and the nature of the materials involved may create problems in the working environment. Additionally, use of this technique is relatively expensive and time consuming, and uniformity and tolerances of the finished product can be difficult to control.

Another technique for retaining the magnets on the core involves wrapping a relatively fine wire, under tension, around the magnetic elements, followed by application of an adhesive or epoxy overcoat to the assembly to protect the metal wire. As with the fiberglass wrap technique discussed above, proper attachment of the wire ends to the core is difficult and relatively expensive to achieve. This technique is also time consuming and labor intensive, and involves a number of distinct operations which may be difficult and costly to automate for the production-setting.

Another technique for retaining magnets around a rotor core involves the use of a cylindrically shaped shell or "can" which is disposed around the outer peripheral surface of the magnet/core sub-assembly to hold the magnets in position. The outer shell is typically formed of a nonmagnetic steel such as INCO-718 (Inconel) or beryllium-copper. At least three techniques for assembling a permanent magnet rotor which uses such a retaining shell have been previously developed. One of these techniques is understood to have originated with Hitachi, Ltd. of Japan and is believed to involve placing a core and magnetic elements in a shell, die casting molten aluminum into the shell to lock the magnetic elements and core in place, and forming end rings at the ends of the rotor so as to completely cover the magnetic elements. The shells of these rotors appear to be formed from a 300 series stainless-steel having a relatively thick-walled construction which is machined after die-casting to a final wall thickness varying between 0.015" and 0.025", depending on point of measurement.

Another technique for assembling an outer retaining shell onto a core/magnet sub-assembly is described in U.S Pat. No. 4,549,341 to Kasabian. This patent discloses a rotor formed from a shaft (10) turned to provide a central area (20) having a larger outer diameter than axially adjacent end areas (15 and 24). A plurality of flat faces (30) are formed on the larger diameter portion and each flat has a steel block (50) mounted thereon conforming in shape to a permanent magnet to be ultimately carried on the shaft. A layer of non-magnetic material (60) (e.g., aluminum) is cast around the larger diameter portion of the shaft and attached blocks, and machined to a diameter slightly larger than the desired finished diameter. The blocks are then removed and replaced with permanent magnets (80) which are typically rare-earth permanent magnets formed of samarium cobalt or Al-nickel 6 and are retained in the apertures by magnetic attraction to the shaft or, alternatively, by an adhesive material. After the magnets are installed, the magnets and adjacent casting surfaces are machined to the desired finished diameter, and an outer non-magnetic steel shell, such as INCO-718, is installed over the magnets by heat shrinking to provide an interference fit between the shell and the underlying casting and permanent magnets. Other patents which disclose the use of a heat-shrink technique for installing a retaining shell over a rotor core and surrounding magnets include U.S. Pat. Nos. 3,531,670 and 3,909,677 which are assigned to The Bendix Corporation, and U.S. Pat. Nos. 4,242,610, 4,332,079, 4,339,874, and 4,445,062 and a number of related patents assigned to the Garrett Corporation.

U.S. Pat. No. 4,617,726 (Denk) discloses an alternative technique for installing an outer shell (110) over a rotor sub-assembly (50). This technique utilizes a tubular housing (120) in which the outer shell (110) is supported and subjected to hydraulic pressure so as to cause the tubular shell to expand radially outwardly. The rotor sub-assembly (50) is forced axially into the expanded shell by a ram to effect a uniform fit between the rotor sub-assembly and the surrounding shell.

Each of the aforedescribed techniques for installing a retaining shell over a core and surrounding magnetic elements has limitations and disadvantages. One disadvantage is the requirement for separate casting and machining operations which are costly, time consuming, and potentially injurious to the magnetic elements. The die casting technique initially requires a shell having a relatively large wall thickness due, at least in part, to conditions attendant to die-casting operations. A machining operation is generally required to reduce the wall thickness of the shell in order to avoid relatively large losses in efficiency.

The described heat-shrink technique is also potentially injurious to the magnetic elements since the heat to which the magnetic elements are exposed can cause the magnetic materials to crack and chip. Additionally, the amount of expansion which can be achieved by heating the shell is limited. For example, the diameter of a shell for a three-inch diameter rotor will increase approximately 0.017" when heated. Accordingly, the machining step required by Kasabian prior to heat-shrink installation of his retaining sleeve must be precise to ensure a high interference fit after cooling of the sleeve. Machining operations of the type described by Kasabian are generally not practical when ferrite or other ceramic magnetic elements are used because such materials are very expensive to machine and cut. Moreover, the materials and techniques conventionally used in the manufacture of ceramic magnets lead to relatively wide variations in dimensional tolerances. For example, ferrite magnetic elements of the size which might typically be used with a three-inch diameter rotor may vary by 0.020" in thickness. The overall diameter of the core and surrounding magnetic elements may vary by up to 0.040". Thus, ferrite magnetic element cannot routinely be used in heat-shrink assembly techniques due to the inherent dimensional limitations. Although the hydraulic expansion technique disclosed in U.S. Pat. No. 4,617,726 avoids possible damage to the magnets inherent in the heat-shrink method, this technique does not address the problems associated with dimensional variations in the magnetic elements and core.

SUMMARY OF THE INVENTION

One of the primary objects of the present invention is to provide a novel permanent magnet rotor assembly which is particularly tolerant of substantial dimensional tolerance variations in the magnetizable elements.

Another object of the present invention is to provide a novel method and apparatus for making a permanent magnet rotor which provide relatively low cost ease of manufacture and result in optimum magnetic element retention.

A more particular object of the present invention is to provide a novel permanent magnet rotor assembly employing a core having magnetizable elements surrounding the core, a sleeve securing the magnetizable elements radially against the core so as to prevent longitudinal movement of the magnetizable elements relative to the core, and end rings retained against the opposite ends of the core so as to retain particles within the rotor assembly in the event of chipping or cracking of the magnetizable elements, a void being formed between at least one of the end rings and the adjacent magnet ends.

Another object of the present invention is to provide a novel permanent magnet rotor and method and apparatus for making the rotor which are highly tolerant of substantial dimensional variations so as to assure a high-interference fit between a plurality of magnetizable elements and a retaining shell irrespective of dimensional variations.

Still another object of the present invention is to provide a rotor structure which is extremely durable, easy to manufacture and relatively inexpensive.

A further object of the present invention is to provide a novel rotor assembly fixture for holding a rotor core and surrounding magnetizable elements in precise relation relative to a cylindrical retaining shell, and which effects uniform pressure application to an end edge of the shell to plastically and elastically deform the shell as it is cold-pressed axially over the core and magnetizable elements.

The aforementioned objects of the present invention may be achieved in accordance with one method of making a permanent magnet rotor which includes the steps of placing a plurality of magnetizable elements around a core and temporarily holding the elements in position, axially aligning the core and surrounding magnetizable elements with a retaining shell, and cold-pressing the retaining shell over the core and surrounding magnetizable elements to permanently retain the magnetizable elements in position around the core.

As used herein, the term "magnetizable elements" refers to elements which are, or which may be, magnetized, and is intended to include elements such as magnetic elements and functional equivalents thereof, whether or not such elements are in a magnetized condition. It is contemplated that under certain conditions it may be desirable to assemble rotors according to the present invention using magnetizable elements which are in amagnetized condition prior to or at the time of assembly. On the other hand, it may also be advantageous to assemble a rotor using magnetizable elements which have not been magnetized, but which are subsequently magnetized prior to actual usage of the rotor.

In one embodiment of the invention, the permanent magnet rotor includes a layer of adhesive which is applied to the outer periphery of the core prior to placing the magnetizable elements around the core. A pair of annular end plates are positioned in axially aligned abutting relation to opposite ends of the core which is made to a relatively precise longitudinal length longer than the magnetizable elements so that at least one of the end plates is spaced from the corresponding ends of the magnetizable elements. A layer or bead of epoxy adhesive is selectively applied to the ends of the magnets which are spaced from the corresponding end plate so as to create a partial void between the ends of the magnetizable elements and the spaced end plate when the epoxy is cured.

In yet another embodiment of the invention, the step of placing the magnetizable elements around the core includes the additional step of positioning the magnetizable elements so as to assure substantially equal circumferential spacing between adjacent elements, and the step of temporarily holding the magnetizable elements in position around the core includes clamping each element in position against the core. The step of cold-pressing the retaining shell axially over the core and surrounding magnetizable elements includes applying a substantially uniformly distributed force to a continuous end surface of the retaining shell to plastically and elastically deform the shell to fit over the magnetizable elements.

The method of the present invention is preferably performed in a press having a rotor assembly fixture defining a working axis (i.e., an axis along which the force generated by the press acts) and on which the rotor core is mounted such that a central axis of the core is coaxially aligned with the working axis of the press. The core is mounted on a bolt support having a base end received within a base fixture portion of the press. A shank extends upwardly from the base of the bolt support and is received through a central bore of a rotor core when mounted on the bolt support. An alignment guide is mounted on the upper end of the shank and serves to receive and align an annular guide sleeve which, in turn, aligns the rotor shell with the core and magnetizable elements when assembled about the core.

The rotor assembly further includes a cylindrical assembly sleeve which is attached to a working cylinder of the press and has an axial bore of a diameter substantially equal to the inner diameter of the rotor shell. The assembly sleeve has a sharp annular edge surface peripherally of its axial bore for contacting the continuous edge surface of a rotor shell so as to apply a substantially uniform force to the upper edge surface of the shell during assembly of the rotor shell axially over the core and surrounding magnetizable elements.

A feature of the rotor assembly fixture of the present invention lies in the provision of apparatus for positioning the magnetic elements in circumferential spaced relation about the core during assembly of the rotor. The magnet positioning apparatus includes a plurality of gauge members which are supported circumferentially of the bolt support for movement radially of a core when mounted on the bolt support. Each gauge has a wedge-shaped tip and is cooperative with an annular control ring operative to simultaneously cam each gauge tip generally radially between a corresponding pair of adjacent magnetic elements so as to effect gauged circumferential spacing between the magnetic elements.

Another feature of the rotor assembly fixture in accordance with the present invention lies in the provision of clamping apparatus for releasably clamping the magnetic elements against the peripheral surface of the core during assembly of the sleeve over the magnets and core. The clamping apparatus includes a plurality of clamps which are supported in generally coplanar alternating relation with the gauge members. The clamps are adapted for radial movement to engage respective ones of the magnetic elements, and include means for releasably locking the clamp ends in clamping position.

In accordance with yet another feature of the rotor assembly apparatus of the present invention, a plurality of dies are provided for incrementally and plastically deforming or crimping the opposite end edges of the rotor shell generally radially inwardly toward the central axis of the shell after the shell has been positioned over the core and surrounding magnetic elements, and after an annular end plate has been positioned against each end of the core in coaxial alignment therewith. In one embodiment of the crimping apparatus, a first die deforms a circumferential edge of the shell over the peripheral edge of the corresponding end plate through an angle of approximately 30°, a second die further deforms the edge through an angle of approximately 60°, and a third die further deforms the edge to an angle of approximately 90°, so that an integral end flange is formed on the shell which lies in a plane normal to the longitudinal axis of the sleeve. The third die is preferably provided with an elastically deformable insert which surrounds and grips the corresponding end of the metallic shell during the crimping operation.

Use of the method and assembly apparatus of the present invention facilitates construction of a rotor which is highly tolerant of a relatively wide range of dimensional variations in the magnetizable elements which surround the core while assuring fixed longitudinal retention of the magnetizable elements relative to the core. In prior heat shrink and hydraulic expansion techniques of the aforementioned type, the dimensional variations in core diameter and magnetic element thickness must be controlled in a very exacting manner in order to obtain a desired fit between the various components of the rotor. In accordance with the present invention, the outer retaining shell is cold-formed around the core and surrounding magnetizable elements which act as a mandrel to radially deform the shell. This enables the use of relatively inexpensive ceramic magnetizable elements which, in a magnetic element having a radial thickness of approximately 0.4"–0.5", may have a dimensional tolerance range of about 0.020" or more (i.e., 5% or greater). Such dimensional variations in the overall diameter of the core and surrounding magnetizable elements cannot be tolerated by known heat-shrink and hydraulic expansion rotor assembly techniques.

Other objects, advantages and features of the present invention will become apparent from the following detailed description of the invention when taken in conjunction with the accompanying drawings wherein like reference numerals designate like elements throughout the several views.

BRIEF DESCRIPTION OF THE DRAWINGS

FIGS. 6(a), 6(b) and (c) are longitudinal sectional views of the apparatus of FIG. 4 illustrating cold-forming of a shell over a core and surrounding magnetizable elements in accordance with the present invention;

FIG. 7 is an enlarged fragmentary detail view of the portion of FIG. 6(b) encircled at "A";

FIGS. 8 (a)–8(f) illustrate the sequence of crimping an end of a magnet retaining shell after assembly onto a core;

DETAILED DESCRIPTION

Figure 1:
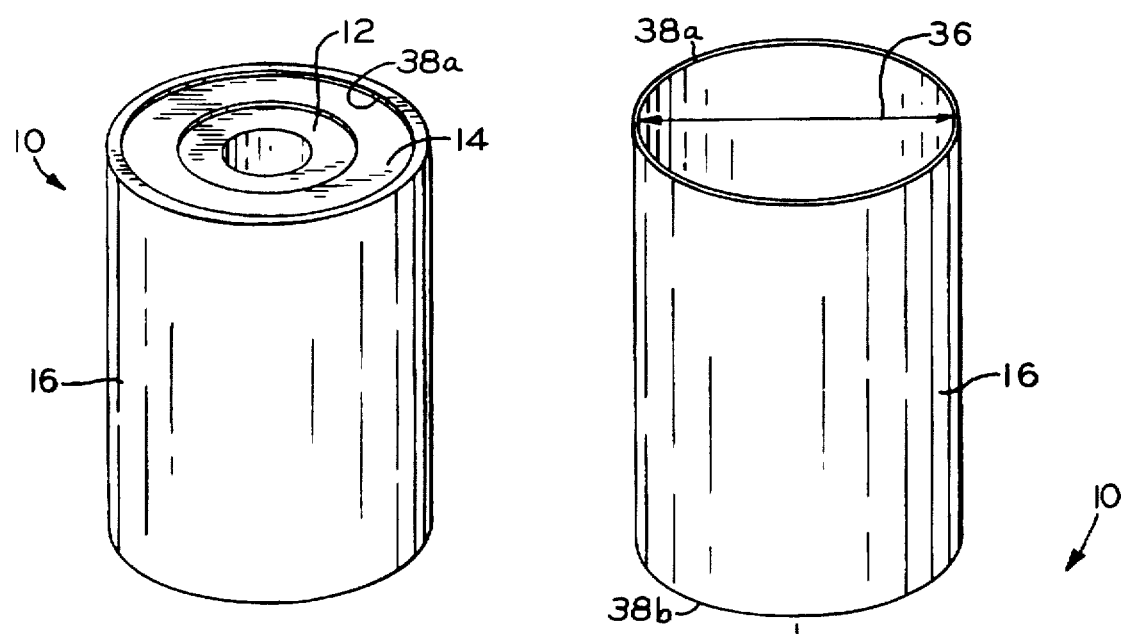
FIG. 1 is a perspective view of a permanent magnet rotor constructed in accordance with the present invention.
Figure 2:
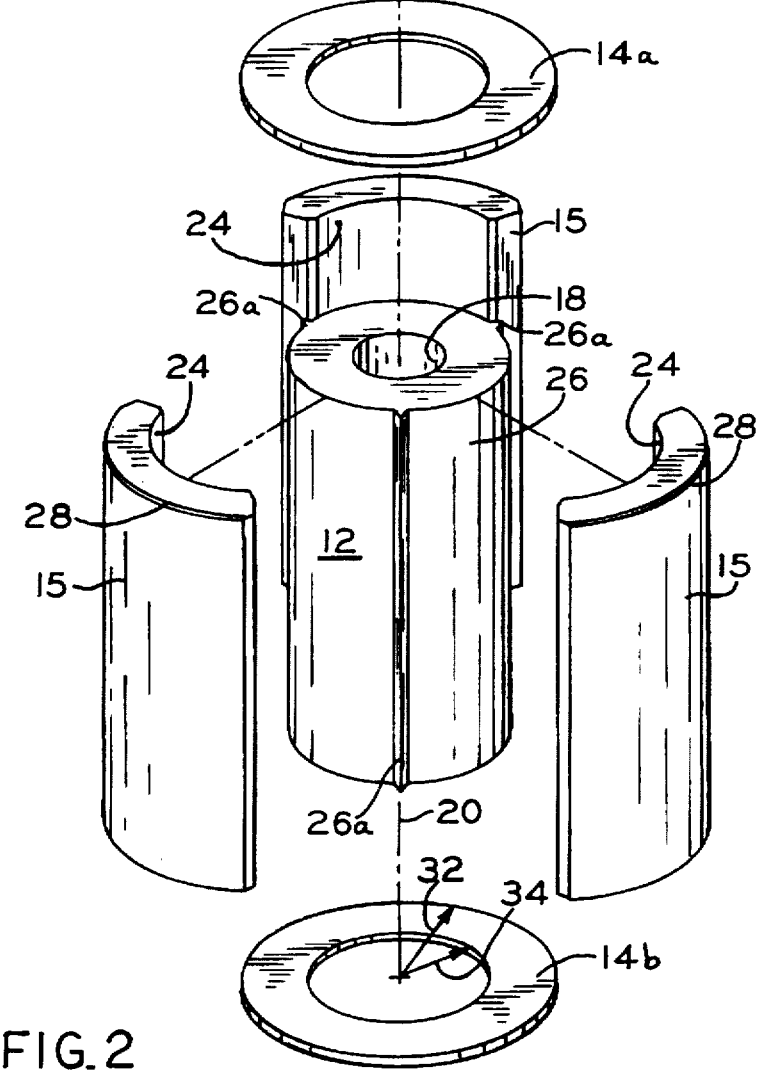
FIG. 2 is an exploded view of the rotor of FIG. 1.
Figure 2A:
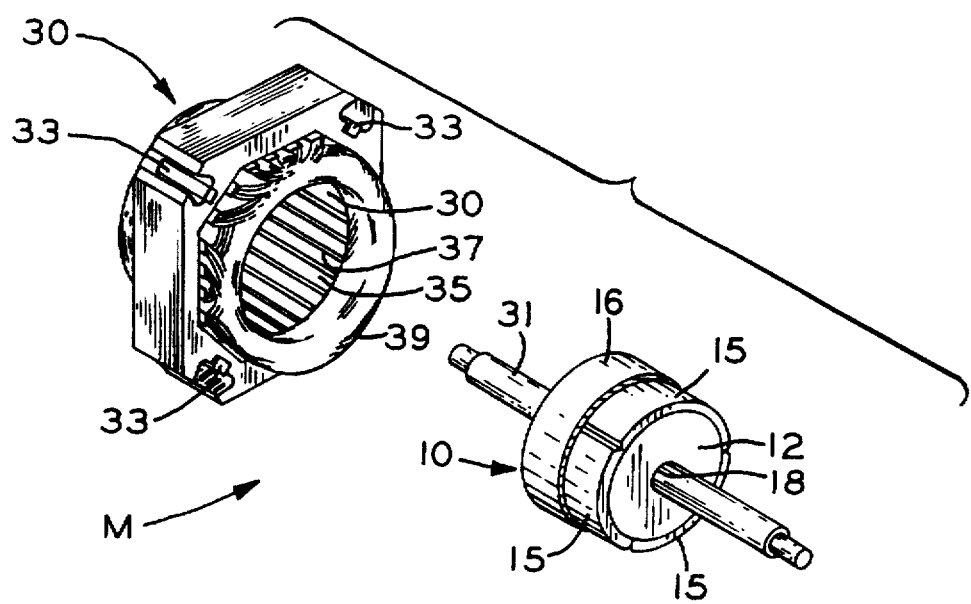
Figure 3:
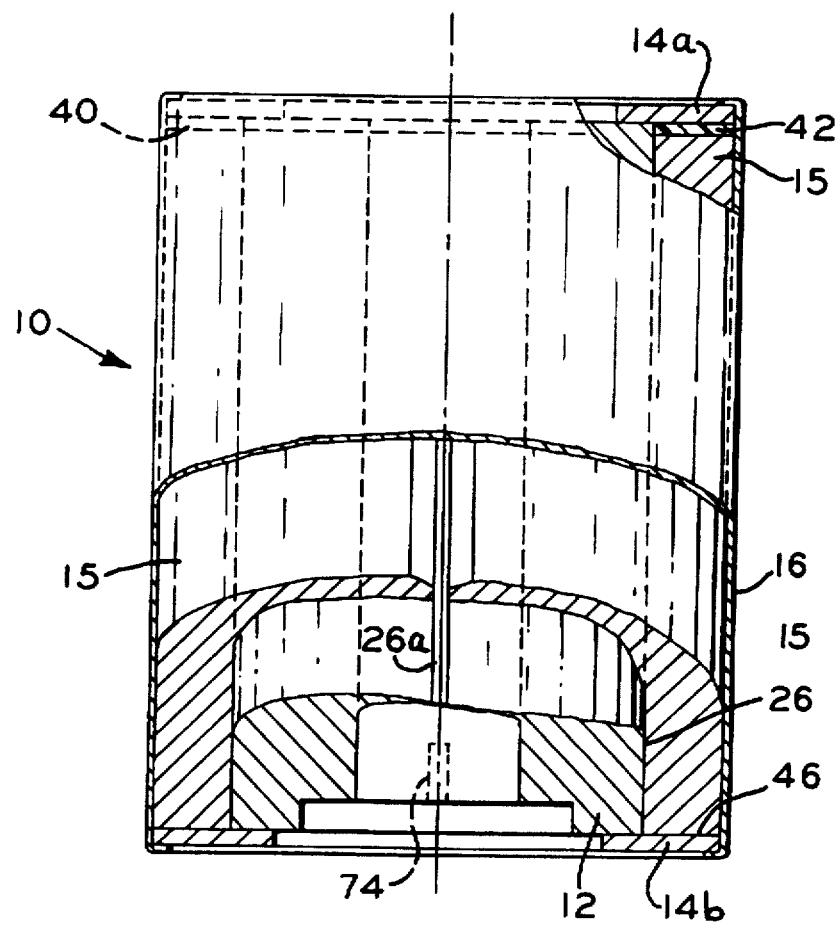
FIG. 3 is an elevational view of the rotor of FIG. 1, but with portions broken away for clarity.

Referring now to the drawings, and in particular to FIGS. 1–3, a permanent magnet rotor constructed in accordance with the method and apparatus of the present invention is indicated generally at 10. Briefly, rotor 10 includes a rotor core 12, a pair of annular end plates 14a and 14b, a plurality of arcuate shaped magnetizable elements 15, and an outer magnet retaining shell 16 which retains the magnetizable elements securely against the core to prevent longitudinal movement of the magnets relative to the core. As will be described, during assembly of the rotor, end portions of the shell which extend longitudinally beyond the ends of the core 12 are formed or crimped radially inwardly to retain the end plates 14a,b against the ends of the core in coaxial relation therewith. A void or gap is formed between at least one of the end plates 14a,b and the adjacent end surfaces of the magnetizable elements 15.

The core 12 is illustrated as comprising a solid metallic or sintered iron cylindrical core having a longitudinal cylindrical bore 18 extending axially through the core and defining a central axis 20. Alternatively, the core 12 nay be made as a laminated metallic core which may be preferred in some applications.

In the illustrated embodiment, three magnetic or magnetizable elements 15 are employed which comprise similarly shaped arcuate ceramic magnetizable elements. As aforementioned, the term "magnetic elements" also includes magnetizable elements since, at the time of assembly with a core 12 to form the rotor 10, the magnetizable elements may or may not be in a magnetized condition. Each magnetic element 15 has an inner arcuate surface 24 having a radius of curvature substantially identical to the radius of the outer cylindrical surface 26 of the core so as to fit against the core when the rotor 10 is assembled. Each magnetic element has an arcuate extent enabling the magnetic elements to be placed against the outer core surface 26 between equally angularly spaced longitudinal ribs or beads 26a formed on the outer core surface, as illustrated in FIG. 2. The ribs 26a assist in preventing rotational sliding of the magnetic elements relative to the core during operation.

At least one end, and preferably both ends, of each magnetic element 15 is provided with an outer radial edge or chamfer 28 to aid in the assembly process. Conventionally, the ceramic magnetic elements are manufactured by techniques which result in relatively wide dimensional variations in both longitudinal length and radial thickness. For example, a typical magnetic element employed in a rotor according to the present invention may have a nominal wall thickness of 0.420", a tolerance range on the inside radius of ±0.005", and a tolerance range on the outside radius of ±0.005", resulting in an overall radial thickness tolerance range of 0.020".

In the illustrated embodiment, the end plates 14a and 14b comprise identical flat aluminum rings or annular washers having an outer radius 32 preferably equal to or slightly less than the combined minimum radius of the cylindrical surface 26 of core 12 and the arcuate magnetic elements 15 when assembled onto the core. Each end plate has an inner radius 34 larger than the radius of bore 18 in core 12, and preferably smaller than the radius of the outer cylindrical surface of the core. The primary function of the end plates 14a and 14b is to prevent broken pieces or fragments of the magnets from leaving the rotor assembly and contaminating the interior of a motor or getting into the air gap. In this respect, the end rings 14a and 14b also assist in maintaining a cracked magnetic element in operational position longitudinally relative to core 12.

The rotor shell 16 is preferably made from a nonmagnetic metal, such as 304 stainless steel tubing. The wall thickness of shell 16 is preferably less than 0.020", with satisfactory results having been obtained with wall thicknesses of between approximately 0.008" and 0.012". A shell wall thickness of about 0.004"–0.006" may also be satisfactory. In general, a decrease in the shell wall thickness will result in a decrease in losses due to eddy currents flowing in the shell and the ability to decrease the size of the air gap between the rotor and stator. The particular material used for forming the shell and the retention strength desired are other factors affecting the shell wall thickness selected.

The initial inner diameter 36 of shell 16 is slightly less than the minimum combined diameter of core 12 and the magnetic elements 15 when assembled against the core.

Shell 16 has a longitudinal length greater than the longitudinal length of the core 12 plus the thickness of the end plates 14a and 14b, and defines opposite continuous circular end edge surfaces 38a and 38b which lie in planes perpendicular to the longitudinal axis of the shell. As will be described, the opposite ends of the shell are subsequently crimped or formed radially inwardly toward the central axis 20 of core 12 so as to overlap and bear against the end plates and retain them firmly against the ends of the core.

The magnetic elements 15 have longitudinal lengths less than the length of core 12. In this manner, when the magnetic elements are supported in a vertical orientation surrounding the core 12 with their lower ends engaging the lower end plate 14b during assembly of the rotor, a gap is formed between the upper ends of the magnets and the upper end plate 14a. The gap 40 is intentional and may vary in width by the range of the combined tolerances of the lengths of core 12 and magnetic elements 15. The core length is preferably held to a relatively close tolerance range so that the variation in width of the gap 40 is primarily the result of variations in the longitudinal lengths of the magnetic elements 15. For example, if a solid core construction is used, a close tolerance range for the core length may be readily obtained. However, conventional manufacturing techniques employed in making ceramic magnetic elements result in the longitudinal lengths of the magnetic elements varying by up to ⅛" for magnetic elements which are 4.0"–6.0" in length. Thus, the extremes of tolerance build-up between the core and magnetic elements will result in a gap 40 which may vary by up to ⅛" or more.

As will later be described, during assembly a generally circular bead of adhesive 42, such as EPON 828 epoxy, is applied to the upper ends of the magnetic elements 15 in an amount sufficient to fill approximately 40%–80% of the gap 40 when the upper end plate 14a is assembled against the upper end of the core 12. Thus, after curing, at least 20% of the volume of the gap 40 remains void. Other adhesives may be used provided they are suitable for the environment in which the rotor will be employed. An adhesive, such as EPON 828 epoxy, is also preferably provided between the outer peripheral surface 26 of core 12 and the inner arcuate surfaces 24 of the magnetic elements 15, and at the interface 46 between the lower end plate 14b and the adjacent lower ends of the core 12 and magnetic elements 15 so as to cover a minimum of 80% of the interfacing surface areas, respectively, between the outer periphery of the core and surrounding magnetic elements, and between the lower end plate 14b and the adjacent lower ends of the magnets and core.

Figure 4:
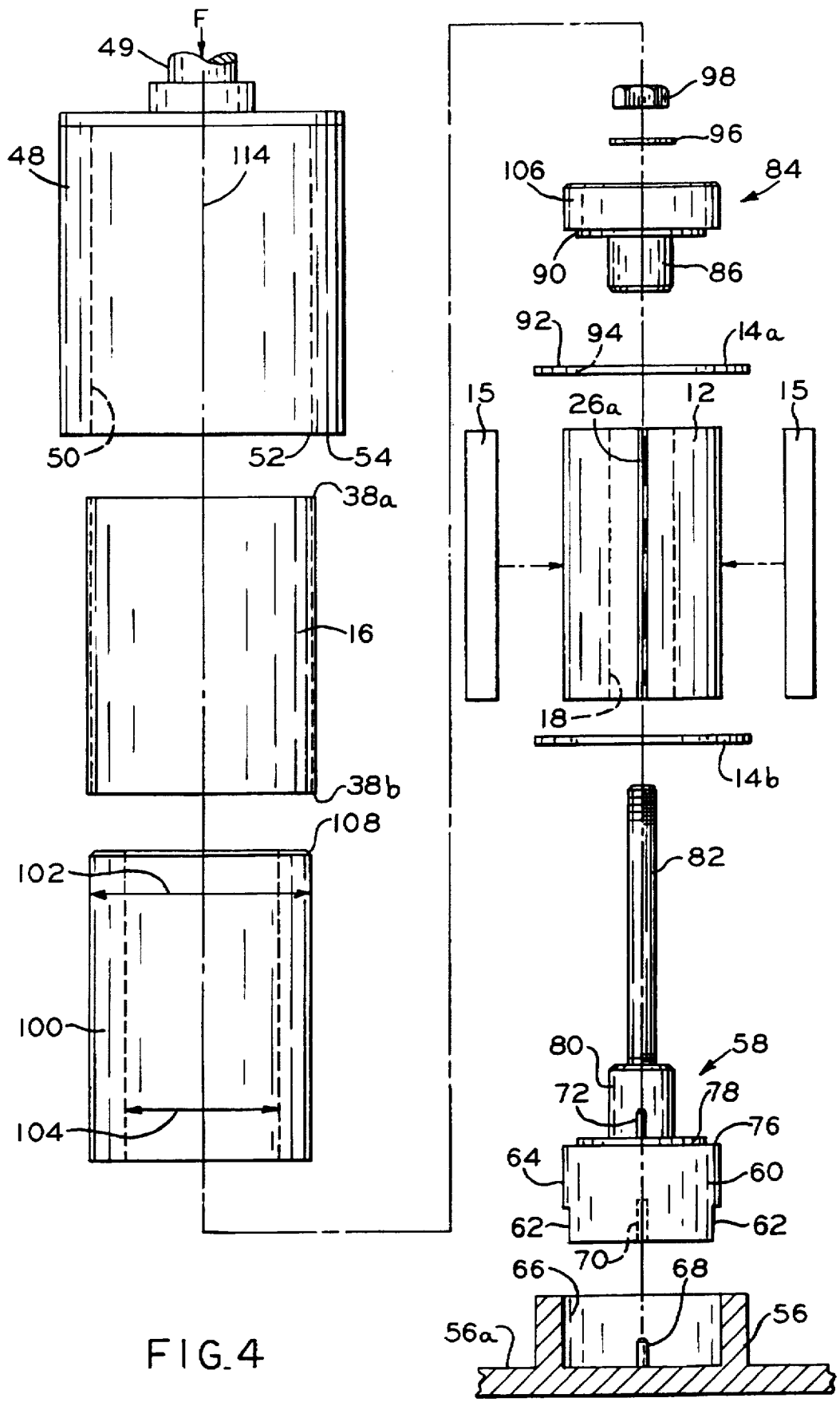
FIG. 4 is an exploded view of a portion of the apparatus used to assemble the rotor of FIG. 1.
Figure 5:
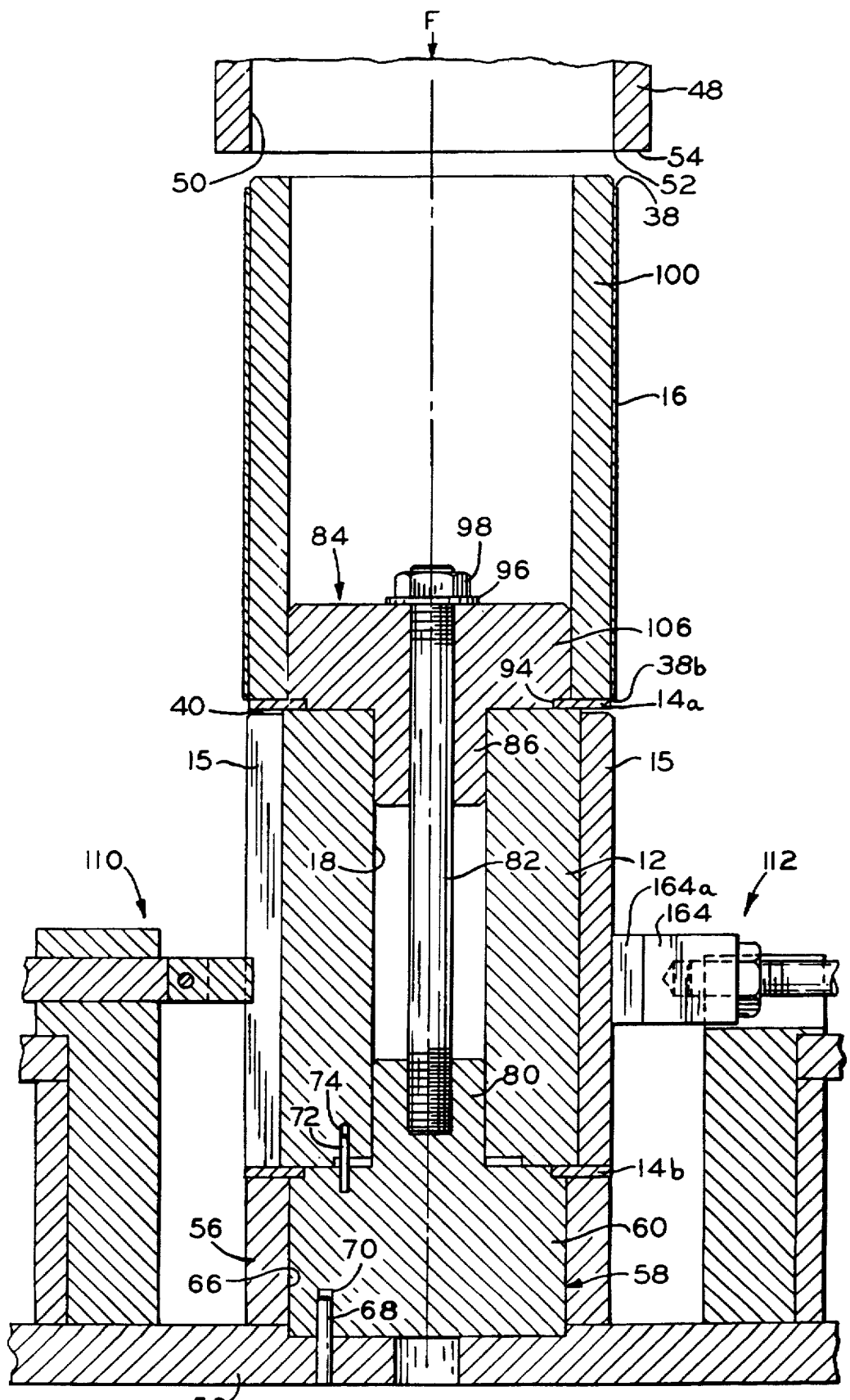
FIG. 5 is a fragmentary longitudinal sectional view of the apparatus of FIG. 4 in assembled relation and further illustrating fragmentary portions of gauging and clamping members for the magnetizable elements.

In accordance with one feature of the present invention, apparatus is provided to assemble the rotor 10 of FIGS. 1–3. Referring to FIGS. 4 and 5, the assembly apparatus includes an upper shell mounting fixture 48 adapted for attachment to a vertically movable ram 49 of a conventional press or like device (not shown) for exerting a downward force F on the components of rotor 10. The shell mounting fixture 48 is in the form of a generally cylindrical sleeve having a closed upper end and an inner cylindrical bore 50 of a diameter substantially equal to the initial inner diameter 36 of shell 16. A lower annual edge 52 of end surface 54 immediately adjacent bore 50 is adapted to uniformly contact the upper end edge 38a of shell 16 so that a downward force F may be uniformly applied to shell 16.

The assembly apparatus includes a lower support fixture, a fragmentary portion of which is indicated at 56, adapted to be mounted on a lower bed or platform (not shown) of the press in coaxial relation with fixture 48. A bolt assembly 58 is supported on the support fixture 56 and serves to support the core 12, magnetic elements 15 and end plates 14a and 14b during the assembly process. The bolt assembly 58 includes a base end 60 having parallel wrench flat surfaces 62 formed on a cylindrical portion 64 which is adapted to be snugly received within a cavity 66 in the support fixture 56. An alignment pin 68 extends upwardly from the bottom of cavity 66 and is received within a blind bore 70 in the base end 60 of bolt assembly 58 so as to establish a predetermined orientation between the support fixture 56 and bolt assembly 58. The bolt assembly 58 has an alignment pin 72 which extends upwardly from the base end 60 and is received within a locating bore 74 (FIGS. 3 and 5) formed in the end of core 12 so as to establish predetermined angular orientation between the core and the bolt assembly. A cylindrical boss 78 is formed on a transverse surface 76 on the base end 60 of bolt assembly 58 and has a diameter sufficient to receive and locate end plate 14b coaxially on the bolt assembly. A cylindrical boss 80 extends coaxially upwardly from the boss 78 and is snugly received within the core bore 18 during the assembly process.

A shank or connecting rod 82 is affixed coaxially to the boss 80 and extends upwardly a distance sufficient to extend through the core bore 18 and through an upper alignment guide or cap 84. The alignment guide 84 has a cylindrical pilot portion 86 adapted to be snugly received within the upper end of the core bore 18, and has a cylindrical locating boss 90 adapted to snugly fit within the central opening 94 in the upper end plate 14a when positioned on the upper end of the core. A washer 96 and nut 98 are mounted on an upper threaded end of the shank 82 to secure the alignment guide against the upper end of the core.

The rotor assembly fixture includes a cylindrical shell guide 100 having an outer diameter 102 slightly less than the initial inner diameter 36 of shell 16 so that shell will slide axially over the shell guide in a snug but non-interfering manner. The shell guide has a coaxial bore 104 slightly greater in diameter than the diameter of a cylindrical surface 106 on the alignment guide 84 such that the shell guide may be releasably mounted coaxially on the alignment guide with the lower end surface of the shell guide engaging the end plate 14a. In this manner precise axial alignment of the shell 16 with the core 12 may be obtained during rotor assembly. The upper outer circular edge of the shell guide is preferably chamfered at 108 to guide the shell 16 over the shell guide and facilitate entry of the shell guide into the cylindrical bore 50 in fixture 48.

With a core 12 and upper and lower end plates 14a and 14b mounted on the rotor assembly fixture as thus far described, three arcuate magnetic or magnetizable elements 15 are positioned against the outer cylindrical surface 26 of the core, with the lower ends of the magnetic elements engaging the lower end plate 14b. As aforementioned, a suitable adhesive is preferably applied to the upwardly facing surface of the end plate 14b and to the outer cylindrical surface of the core for contact with the corresponding interfacing surfaces of the core and magnetic elements. The magnetic elements 15 are of predetermined arcuate dimension so that adjacent longitudinal edge surfaces of the magnetic elements are spaced a predetermined distance apart when the magnetic elements surround and engage the core between the ribs 26a. To facilitate predetermined arcuate spacing of adjacent magnetic elements and clamp the magnetic elements against the core during assembly of the shell 16, gauging means and clamping means in the form, respectively, of a plurality of spacing and gauging devices 110 and a plurality of clamping devices 112 are supported on the base 56 in alternating equidistantly spaced relation about the center axis of the assembly fixture.

The spacing devices 110 are operative to simultaneously position and gauge the circumferential spacing between the magnetic elements so that the magnetic elements are equidistantly spaced around core 12. The clamping devices 112 are operative to temporarily clamp the magnetic elements against the core after spacing and prior to assembly of a shell 16 over the core and magnetic elements. The structure and operation of spacing devices 110 and clamping devices 112 are discussed fully below.

FIGS. 6(a), 6(b) and 6(c) illustrate sequential steps in cold-pressing a shell 16 over the sub-assembly of axially aligned core 12, end plates 14a, b and surrounding magnetic elements 15. For purposes of clarity, the spacing devices 110 and clamping devices 112 are omitted from FIGS. 6(a), 6(b) and 6(c).

After positioning the core, end plates 14a and 14b, and magnetic elements 15 on the bolt assembly 58 and affixing the alignment guide or cap 84 onto the shank 82, the shell guide sleeve 100 is positioned on the alignment guide 84 and a shell 16 is slipped over the guide sleeve, as shown in FIG. 6(a). The upper shell mounting fixture 48 is then brought downwardly to a position wherein its lower end is received over the upper end of the guide sleeve 100 and the edge surface 52 engages the upper edge 38a of shell 16. The edge surface 52 is formed to assure maximum surface contact with the edge 38a of shell 16.

Further downward movement of the shell mounting fixture 48 causes the shell 16 to undergo cold-pressing in which the shell 16 is plastically deformed radially outwardly as it progresses downwardly over the core 12 and surrounding magnetic elements 15 as shown in FIGS. 6(b) and 6(c). The chamfers 28 on the upper outer edges of the magnetic elements 15 assist in the initial outward plastic deformation of shell 16 over the magnetic elements. As an alternative, the lower end edge 38b of shell 16 may be flared slightly outwardly to facilitate initial axial movement of the shell over the magnetic elements 15.

FIG. 7 illustrates in greater detail the plastic deformation of shell 16 as it is formed downward over the core 12 and surrounding magnetic elements 15 which act as a mandrel for plastically deforming the shell. In addition to plastic deformation, some elastic deformation of the shell 16 also occurs so that shell is in a state of circumferential tension and exerts substantial inwardly directed forces on the magnetic elements 15. The extent of deformation of shell 16 may be such that marginal edges and surface markings on the outer surfaces of the magnetic elements 15 can be observed on the outer surface of shell 16 after final assembly of the rotor.

During assembly of the shell 16 onto the core and surrounding magnetic elements, downward movement of the shell mounting fixture 48 is controlled so that the opposite ends 38a and 38b of the shell extend above and below, respectively, the upper and lower end plates 14a and 14b, as shown in FIG. 6(c). As will be described, the end extensions of the shell are formed or crimped radially inwardly over the marginal peripheral edges of the end plates so as to maintain the end plates snugly against the opposite ends of the core. In some applications, it may be desirable to eliminate the extending ends of shell 16 by decreasing the overall length of the shell. In such applications, the end plates 14a and 14b may be held in place by interference fits between the outer peripheral edges of the end plates and the corresponding inner surfaces of shell 16, or by adhesives or other suitable means.

After the shell 16 is assembled over the core 12 and surrounding magnetic elements, as shown in FIG. 6(c), the upper shell mounting fixture 48 is raised, shell guide sleeve 100 is removed, and bolt assembly 58, with core 12, end plates 14a and 14b, magnetic elements 22 and shell 16 in place, is removed from the lower support fixture 56. A period of approximately 24 hours may be required for curing the adhesive between core 12, magnetic elements 15 and end plates 14a and 14b depending upon the type of adhesive utilized, mixture ratios employed, environmental conditions, etc. However, subsequent assembly, shipping, and other operations may continue during the adhesive curing period since shell 16 acts as a clamp to firmly hold the assembled components together until the adhesive cures.

FIGS. 8(a)–8(f) illustrate sequentially the final operation in the assembly method of the present invention. This final operation is a crimping operation in which the ends of the shell extending beyond their corresponding end plates 14a,b are deformed generally radially inwardly over the peripheral edges of the end plates 14a and 14b. This operation is preferably conducted in incremental steps in, for example, three steps. In the illustrated embodiment, these steps involve the use of crimping dies 122, 124, and 126. Other methods or techniques, such roll forming, may also be employed to deform the axially extending ends of shell 16 in the desired manner.

As illustrated in FIGS. 8(a) and 8(b), the crimping die 122 has an inner bore 126 defined by a cylindrical surface 128 and an inwardly tapered annular surface 130. The cylindrical surface 128 has a diameter substantially equal to or slightly larger than the maximum outer diameter of rotor 10. The annular surface 130 is tapered at an angle of approximately 30 relative to the center axis of cylindrical surface 128. With the crimping die 122 positioned in overlying axial alignment with a rotor subassembly as illustrated in FIG. 8(b), application of a predetermined force F1 to crimping die 122 causes the extending end 38a of the shell to be crimped or deformed by the tapered surface 130 inwardly over the peripheral edge of the end plate 14a toward the central axis of the rotor.

A second crimping die 124, having a bore 132 similar to bore 127 but defining an annular surface 134 tapered at an angle of approximately 60 relative to its center axis, is employed to further crimp the extending end 38a of the shell. Thus, application of a further predetermined force F2 to the crimping die 124 causes the end extension 38a of the shell to be further crimped or deformed over the peripheral edge of the end plate 14a, as illustrated in FIG. 8(d).

The final step in the crimping operation employs a crimping die 126 which differs from the crimping dies 122 and 124 in that die 126 has a central bore which terminates in a substantially flat end surface 136 normal to the bore axis. Upon application of a predetermined force F3, the end surface 136 engages the partially crimped end 38a of the shell and flattens it against the outwardly facing peripheral edge surface of the end plate 14a, as illustrated in FIG. 8(f). The crimping die 126 is preferably provided with an insert 138 which may be made of an elastically deformable but firm material such as Teflon, nylon or hard rubber that engages the outer annular surface of the shell 16 as the crimping die 126 undergoes movement to complete the crimping operation. The inside diameter of insert 138 is made slightly smaller than the maximum outer diameter of rotor 10 so as to effect a press fit against the periphery of the shell. The insert 138 serves to minimize bulging of the outer diameter of shell 16 encircled by the insert during a crimping operation, thereby maintaining the shell end diameters within the desired maximum outer diameter of the rotor. The insert 138 also prevents wedging of shell 16 within the crimping die during the crimping operation.

Preferably both of the end extensions 38a and 38b of shell 16 are simultaneously crimped or formed radially inwardly over the outer marginal edges of the corresponding end plates 14a,b prior to removing the rotor from the bolt assembly 58. The shell ends 38a and 38b are crimped simultaneously to avoid axial displacement of the magnetic elements 15 relative to the core 12 and shell 16 by application of crimping ram forces F1, F2, or F3. The crimping operation is preferably performed prior to adhesive cure and prior to removal of the rotor 10 from bolt assembly 58 so that the bolt assembly provides support for both end plates 14a and 14b during the crimping operation. Further the crimping force applied to the shell end extension 38a is controlled so as to prevent bowing or bending of the outer periphery of the end plate 14a which overlies the gap 40 and any uncured resin in the gap.

Referring to FIGS. 9(a), 9(b), 10, 11(a), and 11(b), the spacing and gauge device 110 and clamping devices 112 are supported on a base plate 56a of the base support 56 so as to lie generally in a plane parallel to and spaced above the base plate 56a and intersecting the midpoint of the longitudinal axis of a core 12 when supported by the bolt assembly 58 on the base support 56. For purposes of clarity, the upper end plate 14a, alignment guide 84 and hold down nut 98 are not shown in the plan views of FIGS. 9(a), 10 and 11(a).

The spacing and gauge device 110 includes three radially movable gauge members, indicated generally at 140, which are spaced at 120° intervals about the axis of the base support 56. Each gauge member 140 includes a wedge-shaped gauge tip 142 mounted on the inner end of a support arm 144. Each support arm 144 is supported on the upper end of a stand 146 for longitudinal movement radially of the longitudinal axis of base support 56. Each support arm 144 carries a cam follower in the form of a roller 148 rotatable on a roller support shaft 150 which depends from the corresponding support arm. The cam follower rollers 148 are received within respective cam slots 152 formed in a generally flat actuating ring 154 supported on the stands 146 concentric to and rotatable about the center axis of base support 56. An operating handle 156 is fixed to the actuating ring 154 and is engagable with an adjustable stop 158 supported on the base plate 56a to limit rotation of the actuating ring in a clockwise direction, as viewed in FIG. 9(a).

Figure 9A:
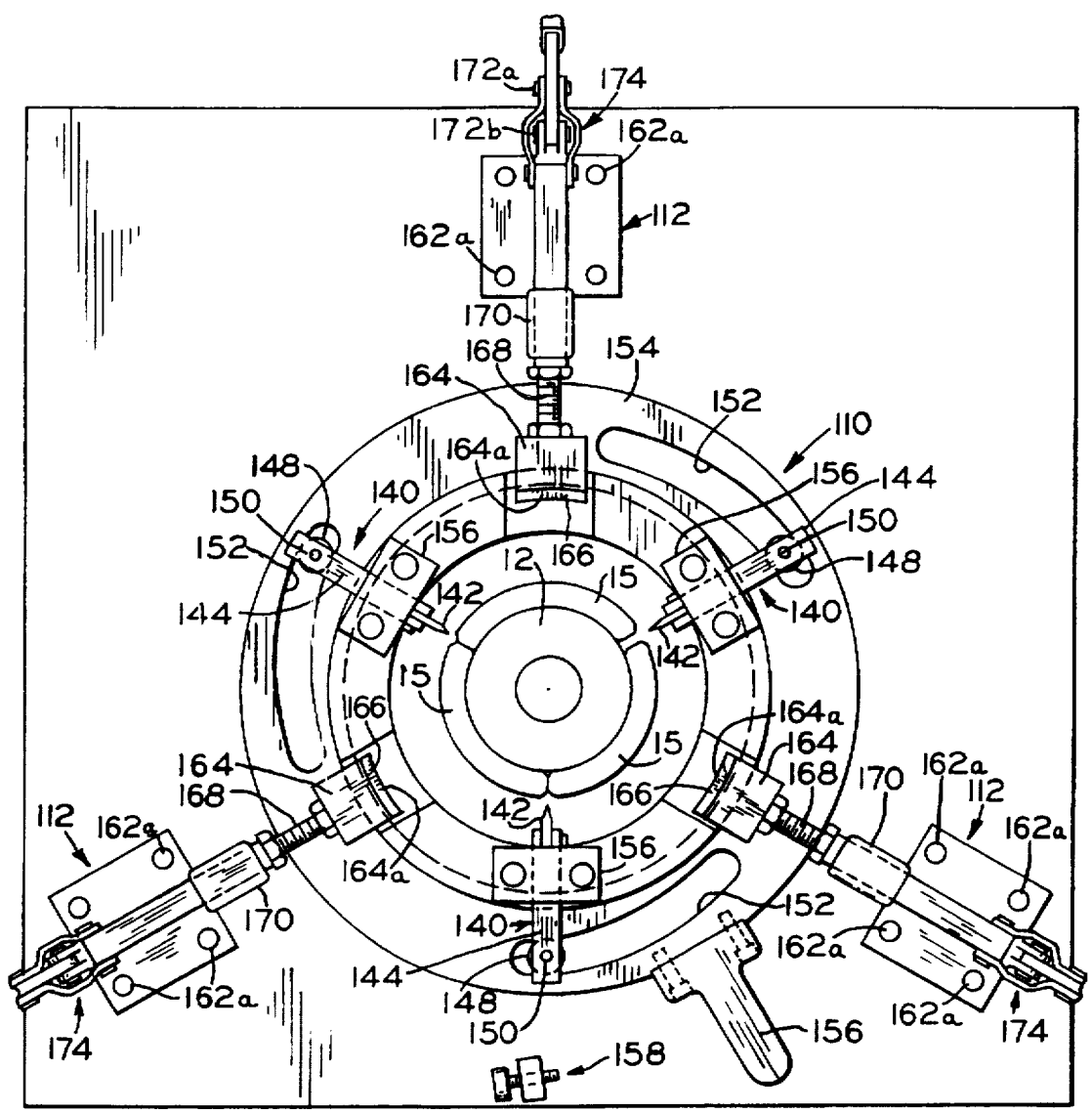
FIGS. 9(a) and 9(b) are fragmentary plans and side elevational views, respectively, of apparatus for circumferentially spacing and clamping magnetizable elements arou he core during assembly.
Figure 9B:
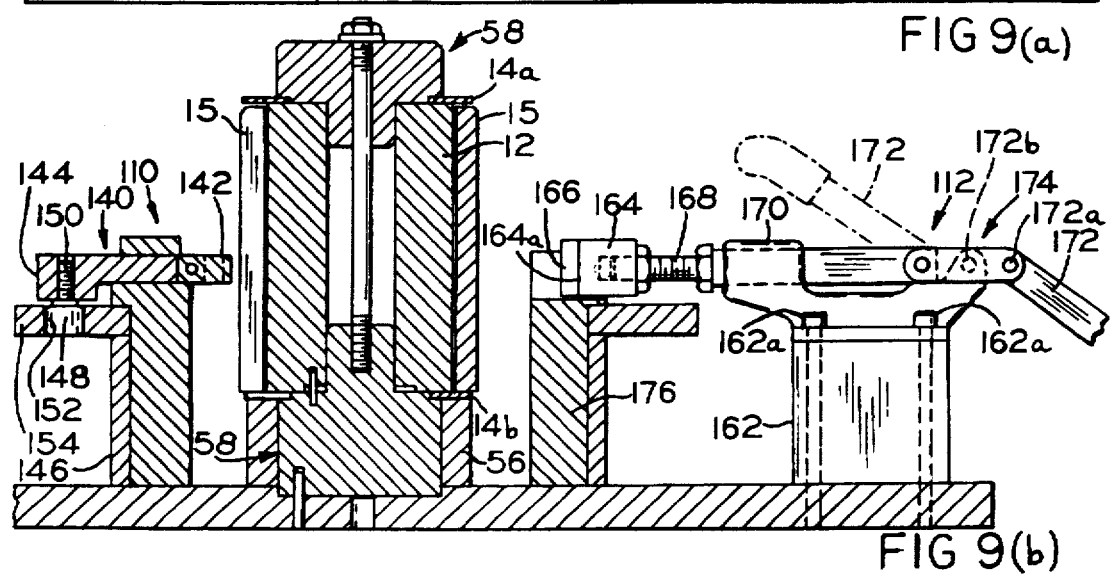

As illustrated in FIG. 9(a), when three magnetic elements 15 are manually placed against and adhesively adhered to the outer cylindrical surface 26 of a core 12 supported on the base support 56, unequal arcuate gaps are generally created between adjacent longitudinal edges of the magnetic elements, notwithstanding that each magnetic element is initially positioned between two longitudinal ribs or beads 26a formed on the outer core surface. If assembly of the rotor were completed with unequal spacing between the magnetic elements, severe imbalance of the rotor would result during high speed operation, with adverse consequences.

The gauge tips 142 and associated support arms and cam slots 152 are configured to effect simultaneous equal radial movement of the gauge tips upon rotation of the actuating ring 154. In the illustrated embodiment, rotation of the actuating ring 154 in a clockwise direction, as viewed in FIGS. 9(a) and 10, until the handle 156 engages the preadjusted stop 158, causes each gauge tip 142 to move radially inwardly and wedge between the adjacent longitudinal edges of two adjacent magnetic elements disposed against the core. Such movement of the gauge tips causes the magnetic elements to move circumferentially about the core 12 until the magnetic elements are equally arcuately spaced or gauged from each other.

To release the gauge tips 144 from the magnetic elements 15, the actuating ring 154 is rotated in a counterclockwise direction. While the illustrated embodiment employs a manually operated actuating ring to actuate the gauge tips 142, it will be appreciated that the actuating ring may be adapted for automatic operation by pneumatics, hydraulics, an electric motor, or other suitable means. Alternatively, the gauge tip support arms 144 may be individually actuated by suitable automatic control means operative to effect equal simultaneous movement of the gauge tips.

Figure 10:
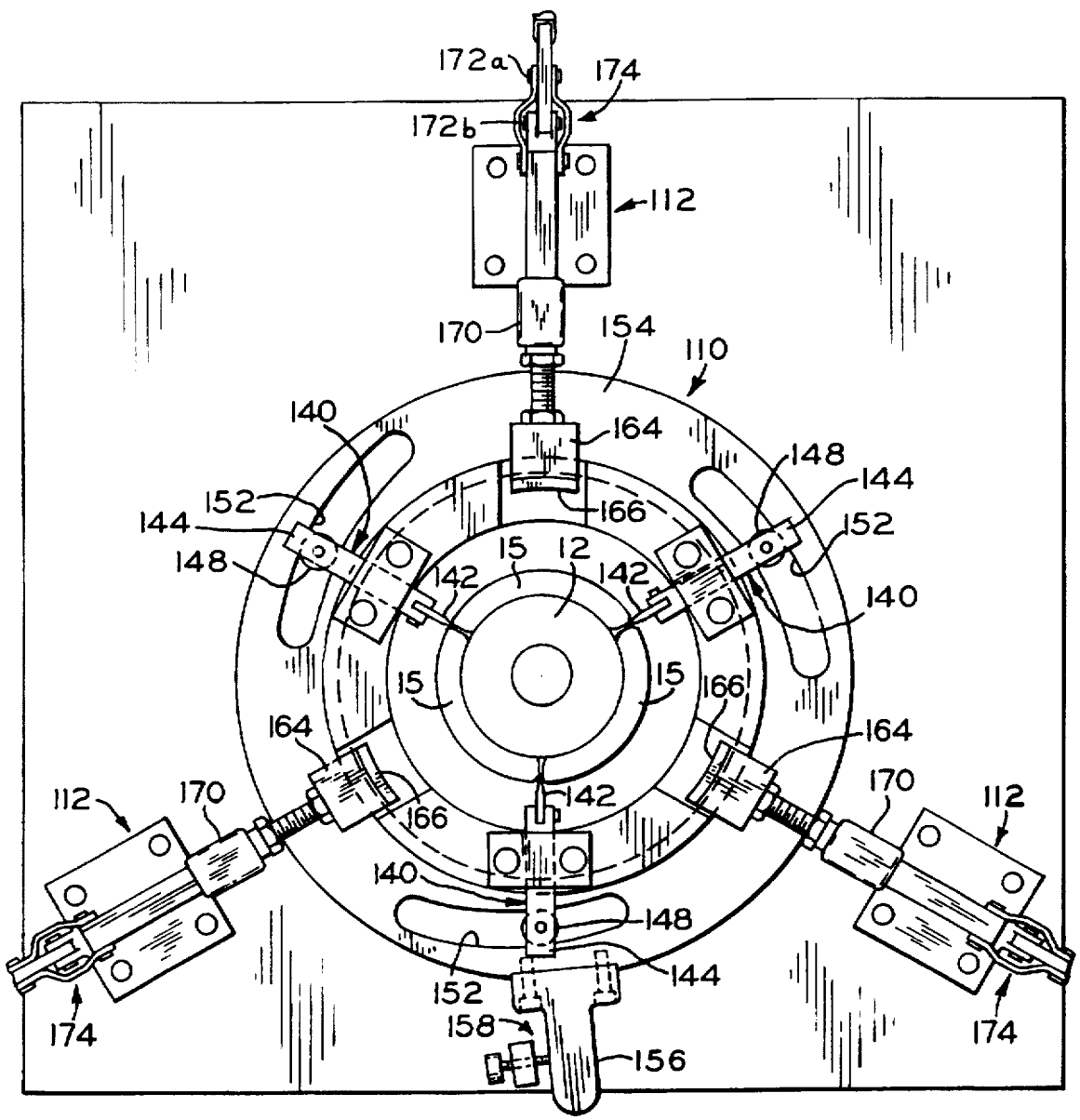
FIG. 10 is a plan view similar to FIG. 9(a) but with the magnet spacing gauge n operative positions.
Figure 11A:
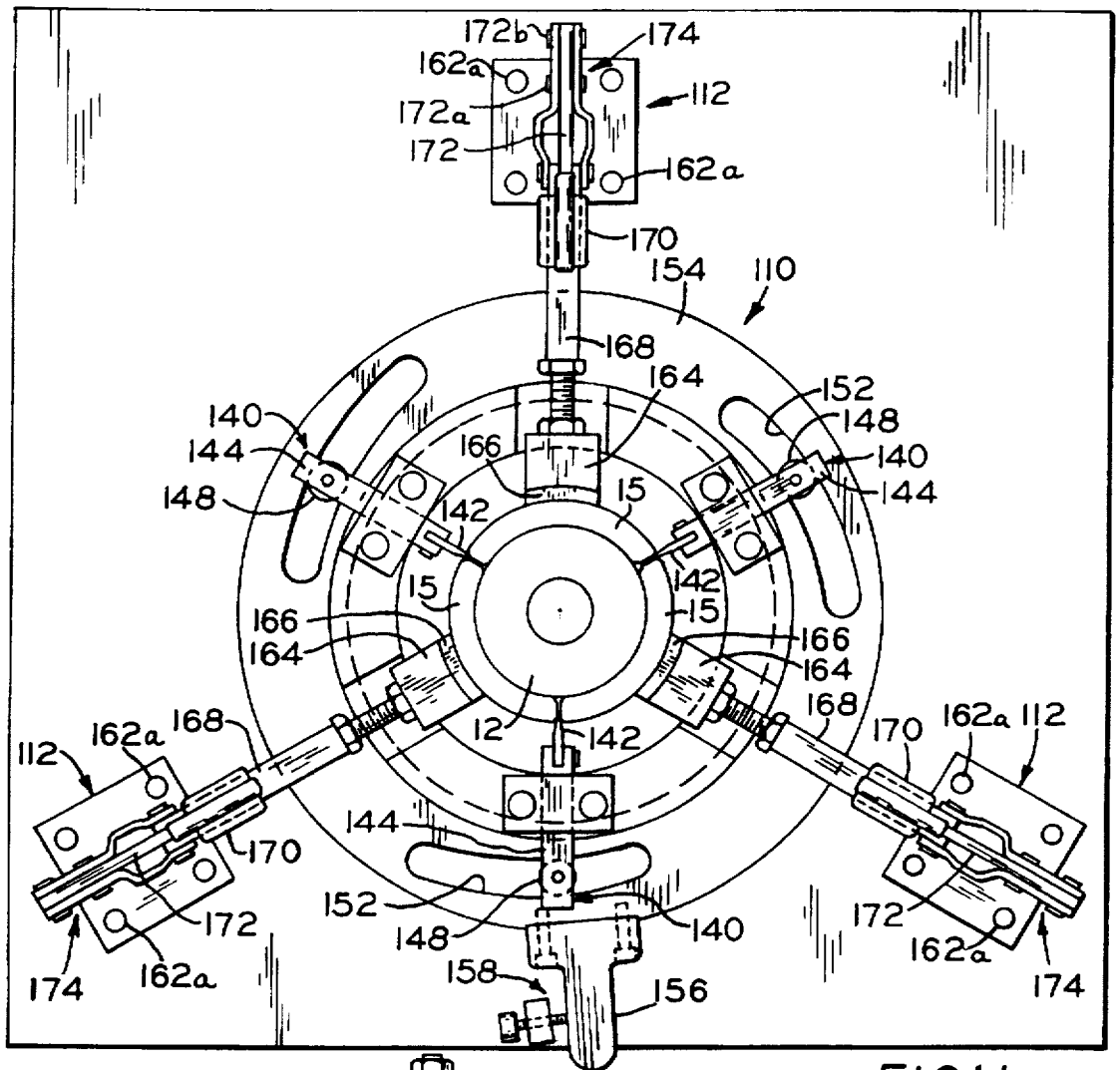
FIGS. 11(a) and 11(b) are plan and side elevational views, respectively, similar to FIGS. 9(a) and 9(b) but with both the spacing and clamping devices in operative positions.
Figure 11B:
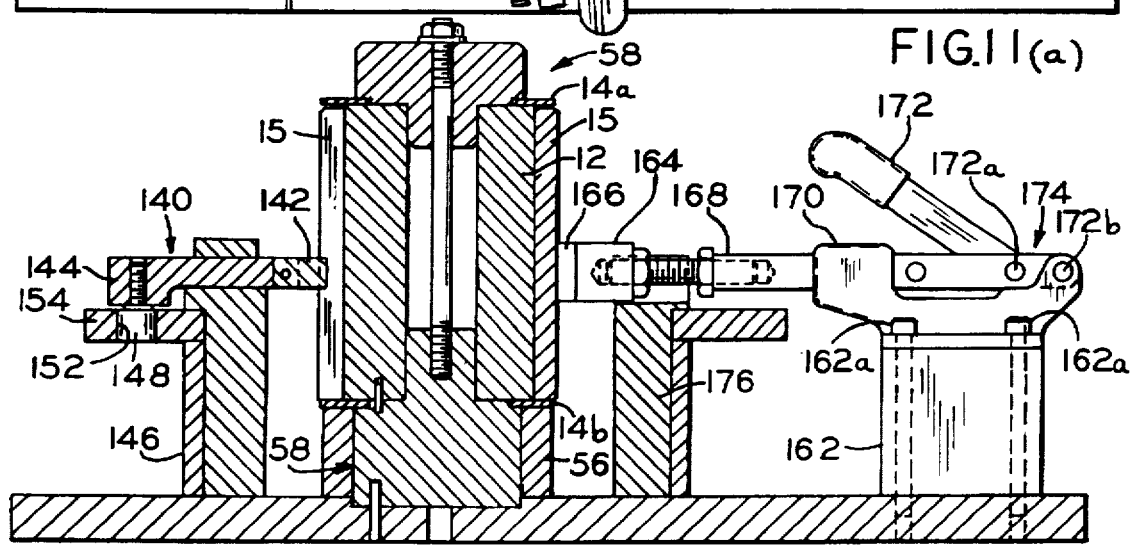

As illustrated in FIGS. 9(a), 10 and 11(a), the three clamping devices 112 are equally angularly spaced between gauge members 140 about the center axis of the support base 56. Each clamping device 112 includes a support bracket 162 mounted on the base plate 56a, as by screws 162a, and has a clamping member 164 having an arcuate clamping surface 164a on which is preferably secured a compressible elastic material, such as a sponge rubber pad 166. Each clamping member 164 is adjustably mounted on a support rod 168 which is reciprocally slidable in a guide bracket 170 affixed on the upper end of a corresponding support bracket 162. The support rods 168 extend radially from the axis of the base support 56 and lie generally in the plane of the gauge support arms 144. The outer end of each support rod 168 is operatively connected to an actuating lever or handle 172 through a linkage arrangement 174. Each actuating lever 172 is pivotally connected at 172a to its corresponding linkage arrangement 174, and is pivotally connected at 172b to the outer end of the corresponding guide bracket 170. The actuating levers 172 are configured such that pivotal movement of the actuating levers between outwardly extending positions, as shown in solid lines in FIG. 9(b), and inwardly extending positions, as shown in phantom in FIG. 9(b), effects reciprocating movement of the corresponding clamping members 164. The levers 172 are also configured to cause their associated pivotal connections 172a to undergo an over-center action relative to the corresponding pivot axes 172b so as to releasably lock the clamping members 164 in clamping positions when the levers 172 are in their inward positions. Three upstanding support blocks 176 are affixed to the base plate 56a so as to slidably support the clamping members 164 and also provide support for the gauge member actuating ring 154.

Following circumferential positioning or spacing of the magnetic elements 15 by the spacing means 110, the clamp actuating levers 172 are actuated to cause the clamping members 164 to engage the outer surfaces of their respective magnetic elements 15, and clamp the magnetic elements against the core 12. During assembly of a shell 16 over a core and surrounding magnetic elements, the gauge tips 142 and clamping members 164 are moved outwardly from the core and magnetic elements when the shell has advanced to approximately one-half the longitudinal length of the core, so as to allow continued cold-pressing of the shell 16 downwardly over magnetic elements. Thus, the clamping members 164 provide a means for temporarily securing the magnetic elements 15 in position against the core 12 until shell 16 has advanced sufficiently to assume this function. Although the clamping members 164 are shown as being manually operated, power operated clamps, with or without automatic controls, may also be used.

Summarizing the operation of the described rotor assembly apparatus during assembly of a permanent magnet rotor 10, a suitable adhesive, such as Epon 828 epoxy, is applied to the outer cylindrical surface of a rotor core 12 so as to provide a minimum coverage of approximately 80% of the outer cylindrical surface. A layer of similar adhesive is applied to one surface of the lower end plate 14b which is placed on the annular surface 76 on the bolt assembly 58 with the adhesive surface facing upwardly. The base 60 of the bolt assembly 58 may then be positioned in the support fixture 56 which is mounted in a press or similar apparatus having a ram 49. The core 12 is then placed on the bolt assembly with the boss 80 received within the axial bore 18 and with the core oriented such that the alignment pin 72 is received within the locating bore 74 in the lower end of the core, thus, positioning the core in predetermined orientation to the support base 56 and associated spacing and gauge members 110 and clamping members 112.

After positioning the core 12 and lower end plate 14b onto the bolt assembly 58, three magnetic elements 22 are placed around the core between the longitudinal ribs 26a. The spacing and gauging devices 110 are then actuated to cause the wedging shaped tips 142 to effect equal arcuate spacing between the magnetic elements. The clamping devices 112 are then actuated through their respective operating levers 172 to bring the clamping members 164 into clamping relation with the corresponding magnetic elements to temporarily hold them in position against the core with the lower ends of the magnets engaging the adhesive covered surface of the lower end plate 14b. As aforedescribed, the core 12 has a greater longitudinal length than the longitudinal lengths of the magnetic elements 22, thereby establishing a space or gap between the upper ends of the magnets and a plane containing the upper end surface of the core 12. An adhesive, such as Epon 828 epoxy, is applied in a generally circular bead to the upper ends of the magnetic elements, and the top end plate 14a is placed on the upper end of the rotor. The alignment guide 84 is then placed over the upper end of shank 82 such that the locating boss 90 seats within the circular center opening in the upper end plate 14a to axially align the upper end plate with core 12 and the lower end plate 14b. The retaining nut and washer 98 and 96 are then mounted on shank 82 to firmly secure the alignment guide 84 in assembled relation. The adhesive applied to the upper ends of the magnets is applied in such quantity as to fill the annular gap or space between the upper end plate and the upper ends of the magnets to a minimum of 40% and a maximum of 80%, thus assuring at least 20% void between the upper end plate and the magnets upon curing of the adhesive. By intentionally limiting the amount of adhesive applied between the upper ends of the magnetic elements 15 and the upper end plate 14a, no adhesive will be squeezed outwardly when the upper end plate is secured against the core end by the alignment guide 84 even though the longitudinal lengths of the magnets may vary significantly due to tolerance variations. This prevents adherence of the adhesive to the assembly apparatus with attendant problems.

The shell guide sleeve 100 is then placed over the upper alignment guide 84 so as to rest on the upper surface of the upper end cap 14a. A stainless-steel shell 16 is then placed over the outer surface of the shell guide sleeve. After placing a shell 16 over the guide sleeve 100, the upper shell mounting fixture 48 is brought downwardly by actuation of the associated press ram 49 to effect cold-pressing of the shell 16 downwardly over the rotor and surrounding magnets as aforedescribed, the gauging and clamping devices 110 and 112 being retracted during downward movement of the shell.

Following assembly of the shell 16 over the core and surrounding magnetic elements such that ends of the shell extend axially below and axially above the lower and upper end plates 14b and 14a, respectively, the bolt assembly 58 is removed from the base support 56 and the end extensions of the shell are crimped or formed generally radially inwardly over the adjacent peripheral marginal edges of the end plates so as to retain the end plates snugly against the opposite ends of the core without causing the end plates to bow or become dish-shaped, as aforedescribed.

It has been found that the force required to cold-press the shell 16 axially onto a core and surrounding magnetic elements having an outer diameter of approximately 3" may vary widely, depending upon the relative dimensional variations of the various components and the physical characteristics, such as hardness and yield strength, of the metallic material from which the shell 16 is made. However, notwithstanding variations in dimensional and physical properties of the core 12, magnetic elements 15 and shell 16, the rotor assembly apparatus in accordance with the present invention provides precise fixturing of the various components in desired aligned relation so as to accommodate varying dimensional and physical characteristics without impeding the assembly process. Shells of nominal three-inch diameter made from annealed 304 stainless-steel welded seam tubing, which after seam-welding, is cold-worked to decrease the wall thickness to 0.008" and to increase the yield strength of all portions of the tubing to approximately 80,000 psi to 120,000 psi have been found to provide satisfactory results in the rotor 10. Satisfactory results are also believed possible using materials having other characteristics, or combinations of characteristics, suitable for particular applications.

It is noted that while the assembly apparatus and method described above employs a movable fixture to press a tubular shell over the core and surrounding magnetic elements, which act as a mandrel to reform the shell, it is contemplated that the shell may be held stationary while the core and magnetic elements are pressed axially into the shell.

While preferred embodiments of the rotor assembly and the apparatus and method for making the same have been illustrated and described, it will be understood that changes and modifications may be made therein without departing from the invention in its broader aspects. Various features of the invention are defined in the following claims.

What is claimed is:

1. Apparatus for making a permanent magnetizable rotor having a generally cylindrical core and a plurality of generally similar size magnetizable elements spaced about the circumference of the cylindrical core, each of said magnetizable elements having longitudinal edges and an inner arcuate surface dimensioned so that the sum of the inner arcuate surface dimensions of said plurality of magnetizable elements is less than the circumference of said cylindrical core, said apparatus comprising, in combination, a support fixture for supporting the core in a fixed position, a plurality of gauges each having a generally convex tip and being supported for movement radially of the longitudinal axis of a core when supported on said support fixture, an actuator operatively associated with said gauges and operative to effect substantially equal simultaneous radial movement of said gauge tips so that each tip is wedged between adjacent longitudinal edges of two adjacent magnetizable elements disposed against said core to cause said magnetizable elements to move circumferentially about said core until equally spaced from each other, and a plurality of clamps supported intermediate said gauges for movement generally radially of the longitudinal axis of a core when supported on said fixture, said clamps each being movable to engage an outer exposed surface of a magnetizable element so as to clamp said magnetizable elements against said core independently of said gauges after equally spacing said elements from each other.

2. Apparatus according to claim 1 including an adjustable stop adapted for cooperation with said actuator so as to limit the extent of radial movement of said gauge tips toward the core when mounted on the support fixture.

3. Apparatus as defined in claim 1 wherein said convex tips are substantially V-shaped.

4. Apparatus according to claim 1 wherein each gauge has a roller having a surface for contacting a camming surface, and wherein said actuator means comprises a movable member having at least one camming surface disposed adjacent each roller such that movement of the movable member causes corresponding radical movements of the gauges in accordance with contours of the respective camming surfaces.

5. Apparatus according to claim 4 wherein said movable member has a plurality of generally circumferential slots defining said camming surfaces, and wherein each gauge roller is disposed in a corresponding one of said slots for interaction with the corresponding camming surfaces when said movable member is moved.

6. Apparatus according to claim 1 wherein each clamp includes an end portion for contacting a corresponding one of said magnetizable elements, actuator means for moving said end portions into clamping relation with the corresponding magnetizable elements, and means for releasably locking said end portions in said clamping relation.

7. Apparatus according to claim 6 wherein each of said end portions includes an elastic element for engaging the corresponding magnetizable element when the end portion is moved into said clamping relation.

* * * * *